Jan. 10, 1933.   A. GUERRIERO   1,893,822
AUTOMOBILE TURN FRAME
Filed Dec. 23, 1930
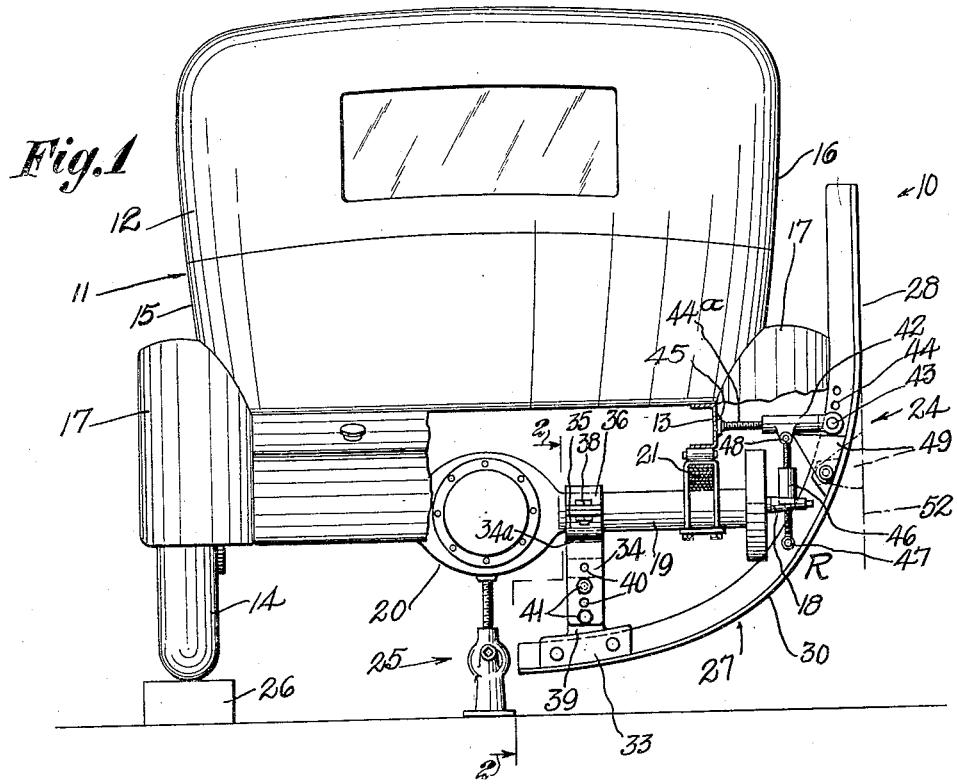
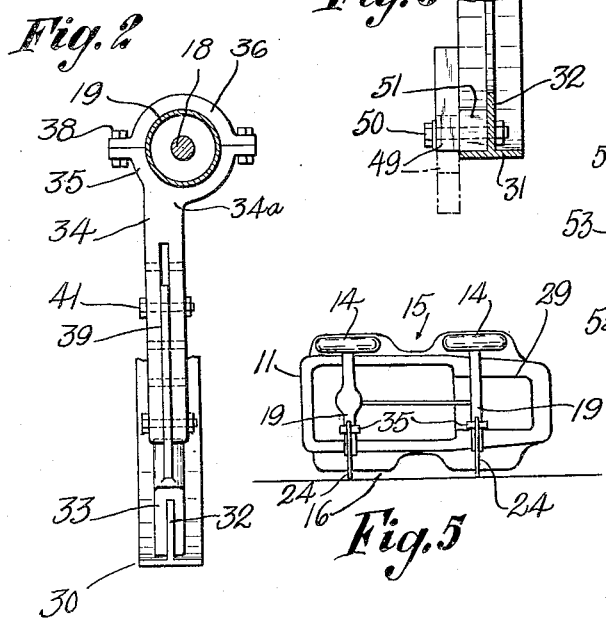
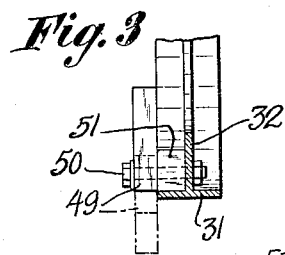
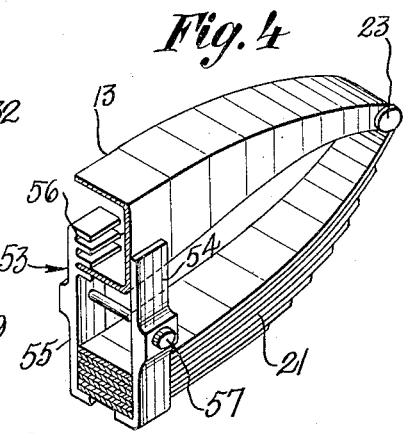
Anthony Guerriero INVENTOR
BY Louis Shumacker ATTORNEY Patented Jan. 10, 1933

1,893,822

UNITED STATES PATENT OFFICE

ANTHONY GUERRIERO, OF BROOKLYN, NEW YORK

AUTOMOBILE TURN FRAME

Application filed December 23, 1930. Serial No. 504,239.

This invention relates to automobile turn frames.

One object of the invention is to provide an improved turn frame for coaction with a vehicle from which the wheels on one side thereof have been removed, to facilitate a compact and simplified arrangement for swinging the vehicle with the bottom thereof extending upward for easy access in making repairs and the like in the machinery of the vehicle.

Another object of the invention is the provision of means for turning an automobile about its longitudinal axis and improved connections between the automobile and the said means to strongly engage the chassis or other frame part of the automobile for reliably supporting the same with a side facing downward and protectively spaced above the ground.

Another object of the invention is to furnish a device of the type mentioned having improved means for locking the springs of a vehicle and coacting with a turn frame for supporting the vehicle on a side and without vibration of the vehicle springs.

Another object of the invention is to construct a device of the character described including means for turning an automobile on a side and properly supporting the same, which means includes a curved turn frame so arranged with respect to the wheels of the automobile that a turn of the latter is made when the turn frame drops to the ground, lowering a side of the automobile.

Another object of the invention is to provide an improved automobile turn means including few and simple parts, and which is inexpensive to manufacture, easy to apply and use, and rugged, reliable, and efficient to a high degree in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a view in rear elevation of a device embodying the invention with parts removed to show the construction.

Fig. 2 is an enlarged vertical sectional view on the broken line 2—2 of Fig. 1.

Fig. 3 is a fragmentary sectional view of a stop means for the turn frame.

Fig. 4 is a perspective view with parts in section showing a spring lock of the invention as applied for use.

Fig. 5 is a diagrammatic view in elevation showing the bottom of an automobile turned on a side thereof according to my invention.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a device embodying the invention. The same may be used with any vehicle, such as an automobile 11. The latter represents any conventional structure, and may include a body 12, a chassis 13, wheels 14 which are provided in the usual manner at both sides 15, 16 of the automobile, and may have fenders 17 coacting therewith. The wheels may be mounted in any suitable manner as on shafts or axles 18 which may extend through housings 19 transversely to the automobile, and these housings 19 may have differential casings 20. Coacting between the housings 19 and the chassis 13 may be resilient means such as series of leaf springs 21, connected to the members 19 as at 22 and to the chassis as at 23.

The automobile above described is to be considered in an illustrative rather than a limiting sense, and while the turn means 24 embodying the invention may be arranged to be directly applied to the automobile, it is preferred to remove both wheels on any one side, such as 16, of the automobile. First, however, the automobile may be braced on a jack 25 or other supporting device, and the latter may be manipulated to slightly raise the automobile, if desired, while supports such as 26 may be placed under the wheels on the side 15 of the automobile. In this position the wheels on the side 16 are conveniently removed. The turn means or turn frame 24 may now be applied to the automobile as shown in the drawing.

The turn frame 24 may include a rolling means 27 and a supporting means 28 so arranged that the automobile may be swung on the rolling means to bring the side 16 of the automobile to face downward while the bottom 29 of the same extends in an upward direction at any desired angle. As the turn frame is rigidly secured to the automobile, the means 27 is preferably of curved form, while the means 28 is straight, flat, or provides a plane base for carrying the automobile with stability on a side thereof. The turn frames 24 preferably extend through the regions R normally occupied by the removed wheel means, so that a compact and simple turn frame may be used sufficiently close to the car to permit the same to be easily swung and to avoid the need for heavy connections.

It will be understood that a plurality of turn frames such as 24 may be used in suitable spaced relation along the automobile. Preferably one turn frame is disposed at or in proximity to each axle of the automobile. Since the turn frames are rigidly connected to the automobile or the frame thereof, interconnecting means between the turn frames are not necessary.

The means 27, 28 may consist of a single bar 30 of suitable size and shape. This may be in the form of a T bar, the flange 31 of which forms the supporting surface, while the web 32 forms a means for connecting the turn frame to the automobile. Secured to the end of the curved portion 27 underneath the automobile is a bracket 33 to which is connected an arm 34 offset at 34a, and having engaging means such as a split socket 35 for receiving a portion of the housing 19 or other part of the automobile which is rigid or may be made rigid with respect to the body 12 thereof. When the housing 19 is to be received in the socket, the cover 36 thereof is removed, and replaced thereover. Then by tightening on the bolts 38 the arm 34 is tightly clamped to the housing.

To adjust the length of the arm 34, the same may include a relatively movable part 39 on the bracket. Both elements 34 and 39 have a plurality of holes 40 adapted to selectively register and receive bolts 41.

To laterally engage the chassis 13 of the automobile, an arm 42 is pivotally connected at 43 to the turn frame in proximity to the end of the curved portion 27 remote from the arm 34. Holes 44 may be provided for adjustment of the position of the pivot 43. In order to take care of a varying lateral spacing between the chassis and the turn frame, a screw 44a may be threaded into the arm 42, said screw having a head 45 to abut the chassis frame. To hold the arm 42 against movement on its pivot, means such as a turn buckle 46 may be pivotally connected to the bar 30 at 47 and to the arm 42 at 48. In this manner, the arm 42 may also be retained at any desired angle with respect to the chassis.

It will be seen that the turn frame lies in a plane substantially common with that of the axle. Furthermore, the curved part 27 extends underneath the automobile and through the region R normally occupied by the removed wheels on the side 16. The straight portion 28 of the turn frame extends upward in spaced relation to the side of the automobile.

To swing the automobile on a side, the jack 25 is released causing the automobile to gradually drop upon the curved part 27 of the turn frame, the weight of the car being transmitted thereto through the arm 34. The swinging of the automobile is thus begun and may be easily continued until the automobile rests on the portions 28 of the turn frames at the front and rear of the same, as shown in Fig. 5. The side 16 of the automobile is thus spaced above the ground to prevent any damage to the car, and the weight of the car is transmitted to the turn frame by the arm 42, directly from the chassis. Since the part 28 lies practically at right angles to the arm 42 the car is safely supported. As the part 28 is relatively long, a stable support is obtained.

By extending the turn frames through the regions R, the same are brought nearer to the automobile, permitting a more even and uniform swinging and with less danger of twisting or distortion as the turn frames are thus as close as possible to the center of gravity of the car.

To prevent return swinging of the automobile, a triangular block 49 may be pivotally connected at 50 to the bar 30 through a spacer block 51. When the car begins to roll upon a side thereof, the block 49 drops gravitationally into the dotted line position. When the block 49 touches the ground 52, the latter first moves the block inward; then the block drops out again and abuts the ground. When the car is to be swung back, the block 49 is released or moved out of holding position in a counter clockwise direction.

In order to lock the springs rigidly in position and prevent vibration of the car when work is being done thereon, the springs 21 are locked by a device 53. The same is applied while the springs are deformed under the weight of the body 12. After the car is turned on a side, the tension of the springs acts on the device 53 causing a strong lock and preventing the spring from vibrating.

The device 53 may be constructed to suit the particular types of springs that may be encountered. It may include angle members 54, 55 to abut opposite sides of the spring and chassis. The member 55 may have a toothed portion 56 for engaging a flange of the chassis according to the spacing thereof from the spring. A bolt 57 passing through the space between the chassis and the spring interconnects said members.

It will be noted that the invention provides a means for swinging an automobile which may include as elements the turn frame, the jack 25, block 26, and locking device 53 in any desired combination or arrangement. All these elements cooperate to produce a unitary result although they are not interconnected, and, in fact, it is simpler to have them retain their identities.

It will be appreciated that various changes and modifications may be made in the device as shown in the drawing, and that the same is submitted in an illustrative and not in a limiting sense, the scope of the invention being defined in the following claims.

I claim:

1. A device for a vehicle having a spring supporting means, means removably connected to the vehicle for turning the vehicle on a side and with said side supported above the ground, and detachable means for releasably locking the spring means under tension to prevent vibration of the vehicle due to said spring means in the turn position of the vehicle.

2. A device for a vehicle having a frame, spring supporting means secured to the frame and tensioned under the weight of the vehicle, said device including detachable means to releasably lock the spring means to the frame to prevent release of the tension of the spring means when a portion of the weight of the vehicle is removed therefrom, and a turn frame detachably secured to the vehicle for swinging the same on a side, with the turn frame swinging with the vehicle and supporting the same above the ground.

3. A device for a vehicle having axles, housings therefor, and having the wheels removed at one side of the vehicle, said device including a plurality of curved turn frames for swinging the vehicle on the side from which the wheels are removed, with the turn frames supporting the vehicle above the ground in the swung position, the turn frames being individually positioned in the planes of the respective axles and being located in the regions vacated by the removed wheels, each of the turn frames extending around the side and across the bottom portion of the vehicle and being detachably secured to the axle housings.

4. A device for a vehicle having a frame, wheels and means for rotatably mounting the same, the wheels at one side of the vehicle being temporarily removed, said device including a turn frame of curved form, said turn frame including an upper portion disposed in relatively close proximity to a side of the vehicle and a lower portion extending underneath the vehicle through the region normally occupied by the removed wheels, means connected to the upper portion of the turn frame and bearing laterally against the vehicle frame, and other means connected to the lower portion of the turn frame and detachably engaged with the means for mounting the wheels.

5. A device for a vehicle having a frame, wheels and means for rotatably mounting the same, the wheels at one side of the vehicle being temporarily removed, said device including a turn frame of curved form, said turn frame including an upper portion disposed in relatively close proximity to a side of the vehicle and a lower portion extending underneath the vehicle through the region normally occupied by the removed wheels, means connected to the upper portion of the turn frame and bearing laterally against the vehicle frame and other means connected to the lower portion of the turn frame and detachably engaged with the means for mounting the wheels, the means for laterally bearing on the vehicle frame including a member whose connection with the turn frame is adjustable therealong, and auxiliary adjustable means connected to the turn frame and to the member at an angle thereto for bracing the latter.

6. A device for a vehicle having a frame, axles, securing means therefor, resilient means connecting the securing means to the frame, wheels on the axles, the vehicle having the wheels at one side thereof removed therefrom, said device including a plurality of turn frames extending upward along a side and downward underneath the vehicle through the region normally occupied by the removed wheels of the vehicle, the turn frames being in the planes of the axles, means removably coacting between the turn frames and the frame for the vehicle and the axle securing means, whereby the vehicle can be swung laterally on a side on the turn frames, and means securing the resilient means in tensioned condition thereof for preventing vibration of the vehicle when laterally supported on the turn frames.

7. A device for a vehicle having the wheels at one side thereof temporarily removed, said device having means including turn frames, and means for detachably securing the same to the vehicle, each of said turn frames having an upward extending portion in proximity to said side of the vehicle and a downward extending curved portion passing underneath the vehicle approximately at the ground level of the wheels, whereby the vehicle can be laterally swung on its side to rest on the turn frames.

8. A device for a vehicle having a frame, wheels and means for rotatably mounting the same, the wheels at one side of the vehicle being temporarily removed, said device having means including a turn frame of curved form, said turn frame including an upper portion disposed in relatively close proximity to a side of the vehicle and a lower portion extending underneath the vehicle through the region normally occupied by the removed wheels, means connected to the upper portion of the turn frame and bearing laterally against the vehicle frame, and other means connected to the lower portion of the turn frame and detachably engaged with the means for mounting the wheels, said other means including a clamping means extending around the means for mounting the wheels.

9. A device for a vehicle having wheels, a frame, axles for the wheels, and means securing the axles to the frame, said means including resilient supporting means, and the wheels at one side of the vehicle being removed, including means for supporting and turning the vehicle on said side, said means including turn frames separable from the vehicle and extending through the region normally occupied by the removed wheels, means detachably connecting the turn frames to the axle securing means underneath the vehicle, means connected to the turn frames and bearing laterally on the vehicle frame, and detachable means connected to the frame and engaging the resilient means for retaining the same under tension.

10. A device for a vehicle having the wheels at one side thereof removed, said vehicle having frame means, including turn frames extending through the region normally occupied by the removed wheels, said turn frames extending along said side of the vehicle and underneath the same, and means removably interengaging the turn frames with the vehicle frame means, as and for the purpose set forth.

In testimony whereof I affix my signature.

ANTHONY GUERRIERO.